(12) United States Patent
Zhao et al.

(10) Patent No.: US 12,221,375 B2
(45) Date of Patent: Feb. 11, 2025

(54) CURVED GLASS TEMPERING APPARATUS WITH EFFECT OF WEAKENING STRESS PATTERNS

(71) Applicant: LUOYANG LANDGLASS TECHNOLOGY CO., LTD., Luoyang (CN)

(72) Inventors: Yan Zhao, Luoyang (CN); Kezhi Zhang, Luoyang (CN); Xibin Zhang, Luoyang (CN)

(73) Assignee: LUOYANG LANDGLASS TECHNOLOGY CO., Luoyang (CN)

( * ) Notice: Subject to any disclaimer, the term of this patent is extended or adjusted under 35 U.S.C. 154(b) by 413 days.

(21) Appl. No.: 17/631,362

(22) PCT Filed: Jul. 14, 2020

(86) PCT No.: PCT/CN2020/101918
§ 371 (c)(1),
(2) Date: Jan. 28, 2022

(87) PCT Pub. No.: WO2021/017820
PCT Pub. Date: Feb. 4, 2021

(65) Prior Publication Data
US 2022/0324743 A1 Oct. 13, 2022

(30) Foreign Application Priority Data
Jul. 29, 2019 (CN) .......................... 201910688109.1

(51) Int. Cl.
*C03B 27/04* (2006.01)
*C03B 27/044* (2006.01)

(52) U.S. Cl.
CPC ...... *C03B 27/0404* (2013.01); *C03B 27/0442* (2013.01)

(58) Field of Classification Search
CPC ............ C03B 27/0404; C03B 27/0426; C03B 27/0431; C03B 27/0435
See application file for complete search history.

(56) References Cited

U.S. PATENT DOCUMENTS

| 4,711,655 A | 12/1987 | Schultz |
| 4,773,926 A | 9/1988 | Letemps et al. |

(Continued)

FOREIGN PATENT DOCUMENTS

| CN | 101980980 A | 2/2011 |
| CN | 110372190 A | 10/2019 |

(Continued)

OTHER PUBLICATIONS

International Search Report issued in corresponding International Patent Application No. PCT/CN2020/101918 dated Oct. 9, 2020.

*Primary Examiner* — Lisa L Herring
(74) *Attorney, Agent, or Firm* — DLA PIPER LLP (US)

(57) ABSTRACT

The present disclosure relates to the technical field of glass tempering, and in particular to a method and apparatus for weakening stress patterns of tempered curved glass. A through continuous reversible deformation cavity replaces an original split-type air box to serve as an air grid. A fluid smoothing structure is distributed in the cavity and configured for reducing fluid resistance. An outlet airflow orienting and stabilizing structure is distributed outside the cavity and configured for constraining the direction, flow velocity and flow quantity of a jetted airflow. A butt-joint device capable of changing with the curvature of the cavity surface is arranged between the cavity and an air supply source for the cavity.

19 Claims, 7 Drawing Sheets

(56) References Cited

U.S. PATENT DOCUMENTS

| | | | | |
|---|---|---|---|---|
| 6,722,160 | B1* | 4/2004 | Nemugaki | C03B 27/0404 65/351 |
| 2005/0000247 | A1* | 1/2005 | Yoshizawa | C03B 35/145 65/273 |
| 2011/0016921 | A1* | 1/2011 | Yoda | C03B 27/0404 65/114 |

FOREIGN PATENT DOCUMENTS

| | | | |
|---|---|---|---|
| CN | 110372191 | A | 10/2019 |
| CN | 210506065 | U | 5/2020 |
| EP | 0128842 | A1 | 12/1984 |
| JP | 2000-281369 | A | 10/2000 |
| WO | 2011/122680 | A1 | 10/2011 |

* cited by examiner

| Reference point technical solution (compressive stress MPa) | Split-type old technical solution | The present patent technical solution |
|---|---|---|
| A(a) | 95.7 | 98.8 |
| B(b) | 89.4 | 99.4 |
| C(c) | 92.3 | 99.2 |
| D(d) | 92.1 | 98.4 |

FIG. 15

CURVED GLASS TEMPERING APPARATUS WITH EFFECT OF WEAKENING STRESS PATTERNS

CLAIM FOR PRIORITY

This application is a U.S. national phase entry under 35 U.S.C. § 371 from PCT International Application No. PCT/CN2020/101918 filed on Jul. 14, 2020, which is based upon and claims the benefit of priority from prior Chinese Patent Application No. 201910688109.1 filed on Jul. 29, 2019. The entire contents of the above applications are incorporated herein by reference.

TECHNICAL FIELD

The present disclosure relates to the technical field of flexible shaft bent glass tempering, and in particular to curved glass tempering apparatus with an effect of weakening stress patterns.

BACKGROUND

In the production process of tempered glass, glass enters a tempering section after being heated in a roller-type heating furnace, but it tends to leave stress patterns (commonly called air patterns) on the glass due to uneven air blowing in the tempering process of the glass. As an indicator of appearance quality, the air patterns on tempered glass attract more and more people's attentions. In order to reduce the air patterns as much as possible, persons having ordinary skill in the art have taken various ways, such as accelerating the glass discharge speed, optimizing the layout of air holes, and swinging an air grid laterally. However, formation of the air patterns is complicated, and in addition to that in a width direction of an apparatus, it is necessary to form uniform cooling. More importantly, it is also necessary to eliminate formed air patterns in a length direction of the apparatus. So far, air patterns of a tempering furnace are still a defect of tempered glass. People desire a better air pattern weakening technology to make the appearance of tempered glass better.

Figure 1:
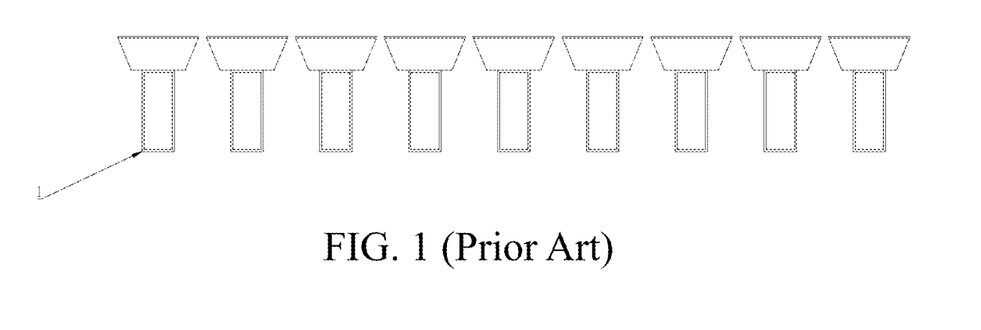
FIG. 1 is a schematic diagram of a split-type air box used for curved glass tempering in the prior art.

Nowadays, flexible shaft bending tempering is mainly formed by bending a flexible shaft roller in a direction perpendicular to the conveying direction; and two ends of a flexible shaft group arranged in parallel are provided with arc-changing mechanisms parallel to the flexible shaft group in the axial direction thereof. Two ends of a plurality of main air supply pipelines are respectively fixed to toothed plates on the arc-changing mechanisms at corresponding positions; and a flexible shaft is arranged perpendicularly to the main air supply pipeline. Air boxes are alternately arranged on the main air supply pipeline corresponding to gaps of the flexible shaft. The air box is hollow inside and communicated with the main air supply pipeline. Airflow is blown to the curved glass to be tempered from an air outflow end of the main air supply pipeline through the air box from an air outlet formed in the air box. In order to ensure that air blowing is uniform in the bending process, most of the conventional technology uses rows of air boxes on the material for air blowing. The rows of air boxes are distributed between gaps of the flexible shaft rollers. As shown in FIG. 1, stress patterns are mainly caused by the use of a technology with an air grid comprising air boxes. There will be obvious stress pattern marks left on the glass due to the gaps between the air boxes, seriously affecting the aesthetics and use effect of the glass.

A flexible shaft bent glass tempering furnace comprises an upper sheet table, a heating furnace, a forming and tempering unit, a lower sheet table, and the like. All working sections are connected by rollers with an equal-height horizontal conveying surface to constitute a production line.

In operation, the glass is placed on the upper sheet table, the glass is fed into the heating furnace by the rollers, heated to a suitable temperature, and then conveyed by the rollers to the forming and tempering unit. In the unit, the glass is bent into a desired shape, and then tempered and cooled by air blowing by an air grid therein to form tempered glass. Finally, the glass is fed into the lower sheet table by the rollers to complete a working cycle.

Figure 2:
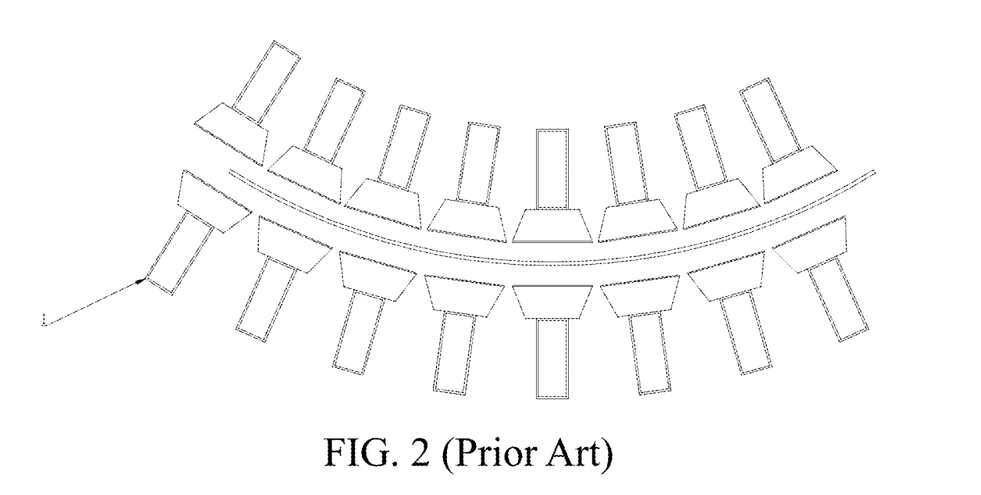
FIG. 2 is a schematic diagram of a bent state for adopting a structure in FIG. 1 when glass is processed.

The above-mentioned forming and tempering unit comprises a bendable roller, a main air supply pipeline, a roller transmission system, a bendable air grid, an air grid driving device, a machine frame, a control system, and the like. Before the glass is formed and cooled by air blowing, the bendable air grid therein can be pre-bent into a shape required for the glass, so as to make cooling of the glass more uniform, thereby making the stress on the surface of the glass and inside the glass more uniform. It is also possible to bend upper and lower air grids synchronously with bending of the bendable rollers; then the upper and lower surfaces of the glass are tempered by air blowing; and finally, the quality requirement of tempered glass is met. In order to be bent, an existing bending air grid comprises a plurality of independent air boxes and is mounted on the main air supply pipeline. The main air supply pipeline is driven by the arc-changing mechanism to drive the rows of air boxes to be bent into the shape required by the glass shape, as shown in FIG. 2.

However, due to the fact that the air grid comprises independent air boxes, the air outflow pressure of each air hole is uneven and there are gaps between the air boxes, so that tempering and cooling of the curved glass are uneven, thereby leaving obvious stress patterns (air patterns) on the processed tempered glass at positions of the gaps of the air boxes, seriously affecting the appearance quality of a tempered glass product. This is a pressing technical problem to be solved in the industry.

SUMMARY

To resolve the foregoing technical problems to be solved proposed in this solution, the present disclosure provides the following technical solutions.

A curved glass tempering apparatus with an effect of weakening stress patterns is configured for flexible shaft bent glass tempering. The apparatus comprises a flexible air grid. The flexible air grid comprises one or more flexible air grid units. Each of the one or more flexible air grid units is a bendable flexible tubular structure with an internal passage. Each of the flexible air grid units is provided with a plurality of air outflow holes and a plurality of air inflow ports. The plurality of air outflow holes and the plurality of air inflow ports are communicated with an interior space of the flexible air grid unit. And the plurality of air outflow holes face toward the glass to be processed.

Further, the apparatus comprises a plurality of main air supply pipelines located on one side of the one or more flexible air grid units opposite to the glass to be processed. The one or more flexible air grid units are arranged in parallel in the gaps between flexible shaft rollers. The plurality of main air supply pipelines arranged in parallel and the plurality of the one or more flexible air grid units arranged in parallel are projected vertically into an interlocking mesh shape. The plurality of main air supply pipelines are communicated with the one or more flexible air grid units via the plurality of air inflow ports at projection intersection point positions. Arc-changing mechanisms arranged at two ends of the plurality of main air supply pipelines arranged in parallel drive the flexible air grid to be bent with the arc-changing mechanisms when the glass to be processed is bent and formed.

Further, the one or more flexible air grid units are corrugated pipes.

Further, the plurality of main air supply pipelines arranged in parallel and the plurality of one or more flexible air grid units arranged in parallel have an angle of 90° on a vertical projection plane.

Furthermore, the plurality of main air supply pipelines are arranged in parallel at intervals along a direction in a horizontal plane perpendicular to the glass conveying direction. Each of the plurality of main air supply pipelines is provided with a plurality of air supply ports. The air supply ports and the air inflow ports are connected via connecting pieces. And two axial end portions of each of the one or more flexible air grid units are respectively connected to the main air supply pipelines arranged on left and right sides of the tempering section.

Further, the flexible air grid units are cylindrical or prismatic air grids.

Further, two axial ends of the one of the one or more flexible air grid units are closed structures.

Further, the air inflow ports are respectively communicated with air outflow ends of the main air supply pipelines.

A curved glass tempering apparatus with air outflow mechanisms further comprises an air outflow mechanism.

The air outflow mechanism is arranged on a flexible air grid unit, and comprises a fluid smoothing structure arranged on an inner wall of the flexible air grid unit and/or an outlet airflow orienting and stabilizing structure arranged on an outer wall of the flexible air grid unit. The fluid smoothing structure is configured to reduce resistance when an airflow circulates in the flexible air grid. The outlet airflow orienting and stabilizing structure is configured to constrain the direction of a jetted airflow and make the flow velocity and flow quantity of the airflow and the jetted airflow more uniform at the same time.

Further, the flexible air grid unit is a corrugated pipe. The fluid smoothing structure is a composite rubber layer for filling a corrugated inner wall of the corrugated pipe into a smooth inner wall.

Further, one of the plurality of air outflow holes is located at a position of the corrugated pipe with the maximum corrugation outer diameter.

Further, the outlet airflow orienting and stabilizing structure is an independent air nozzle communicated with a respective one of the air outflow holes. The independent air nozzle is of a tubular structure. One end of the independent air nozzle is in butt joint with the air outflow hole and the other end of the independent air nozzle faces toward the glass to be processed.

Further, the outlet airflow orienting and stabilizing structure is a fixing piece arranged on a corrugated outer wall of the corrugated pipe and covering the air outflow holes. The fixing piece is provided with air spraying holes corresponding to positions of the air outflow holes. The air spraying holes are communicated with the air outflow holes.

Further, the quantity of the air outflow holes is two or more.

A curved glass tempering apparatus with butt-joint devices further comprises air inflow butt-joint auxiliary devices.

The butt-joint auxiliary device is configured for butting a main air supply pipeline with a flexible air grid unit. The butt-joint auxiliary device comprises an air inlet, an air outlet, and a channel communicating the air inlet with the air outlet. A fixed extension in butt joint with an air supply port of the main air supply pipeline is arranged at a position of the air inlet. A butt-joint end in butt joint with an air inflow port of the flexible air grid unit is arranged at a position of the air outlet.

Further, the butt-joint end is provided with a sealed outer edge matched with an outer wall contour of the flexible air grid unit.

Further, the flexible air grid unit is a corrugated pipe.

Further, the butt-joint end is connected with the flexible air grid unit in a bonding mode or a riveting mode.

Further, the butt-joint end is provided with an annular clamping hoop for locking the metal corrugated pipe.

Further, the butt-joint auxiliary device is a flexible butt-joint auxiliary device.

Further, the flexible butt-joint auxiliary device is made from high-temperature-resistant rubber.

In the present disclosure, an air grid unit comprising air boxes independent from each other in the air grid is replaced with a through flexible air grid unit, so that a continuous air grid perpendicular to the movement direction of glass is formed. During the movement of glass, air blows onto tempered glass, such that strip-shaped air patterns remaining in a cooling process performed by an air grid in the prior art are removed, thereby greatly improving the appearance and quality of tempered glass.

By adopting the air outflow mechanism provided by the technical solution, an airflow channel with many corrugations on the inner wall of the flexible air grid unit is smoothed to reduce fluid resistance. The additionally arranged independent air nozzle or fixing piece is free of deformation. The airflow ejected out of the air outlet of the flexible air grid thereof is stably guided so that the jetting direction, flow velocity and flow quantity of the airflows are regulated and controlled to be oriented, orderly, and stable to a certain extent.

For the flexible air grid with an outer surface being an irregular curved surface, a butt-joint position can be completely matched with the outer contour of the flexible air grid unit. When the flexible air grid bends along with the arc-changing mechanism, the outer surface curvature of the flexible air grid may change. A butt-joint portion can change into an irregular curved surface accordingly; and an air leaking phenomenon cannot occur.

The air grid adopts a continuous air grid mechanism to replace an air grid comprising discontinuous air boxes in the prior art, so that when the curved tempered glass is processed, the problem of stress defects caused by air box gaps cannot occur. The processing method in this field is changed fundamentally, and it is a pioneering advancement.

Reference numerals: main air supply pipeline 1, air inflow port 21, flexible air grid unit 2, air outflow hole 22, Composite rubber layer 23, independent air nozzle 24, fixing piece 25, air spraying hole 251, air supply port 11, flexible air grid 2, butt-joint auxiliary device 3, air inlet 4, air outlet 5, butt joint end 51.

DETAILED DESCRIPTION

The technical solutions in the present disclosure are clearly and completely described below with reference to the accompanying drawings. Apparently, the described embodiments are merely some of rather than all of the embodiments of the present disclosure. All other embodiments obtained by a person of ordinary skill in the art based on the embodiments of the present disclosure without creative effects shall fall within the protection scope of the present disclosure.

In the description of the present disclosure, it should be noted that orientation or position relationships indicated by the terms such as "center", "above", "below", "left", "right", "vertical", "horizontal", "inside", and "outside" are based on orientation or position relationships shown in the accompanying drawings, and are used only for ease and brevity of illustration and description of the present disclosure, rather than indicating or implying that the mentioned apparatus or component must have a particular orientation or must be constructed and operated in a particular orientation. Therefore, such terms should not be construed as limiting of the present disclosure.

In the description of the present disclosure, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. The specific meanings of the above terms in the present disclosure may be understood according to specific circumstances for a person of ordinary skill in the art.

Referring to FIG. 2, split-type air boxes are mostly adopted in conventional technologies, and stress patterns can be formed on a surface of glass to be processed at positions of gaps between the air boxes. Rectangular frames in FIG. 2 are main air supply pipelines 1. Airflow is blown to air boxes in trapezoidal parts in the figure from the main air supply pipelines. The air box is communicated with the main air supply pipeline 1. Upper and lower surfaces of the curved glass to be processed are each provided with the above-mentioned structure.

In a method for weakening stress patterns of tempered curved glass,
- a through continuous reversible deformation cavity replaces an original split-type air box to serve as an air grid;
- a fluid smoothing structure is configured inside the cavity and configured for reducing fluid resistance;
- an outlet airflow orienting and stabilizing structure is configured outside the cavity and configured for constraining the direction, flow velocity and flow quantity of a jetted airflow; and
- a butt-joint device capable of changing with the curvature of the cavity surface is arranged between the cavity and an air supply source for the cavity.

Embodiment 1

Figure 5:
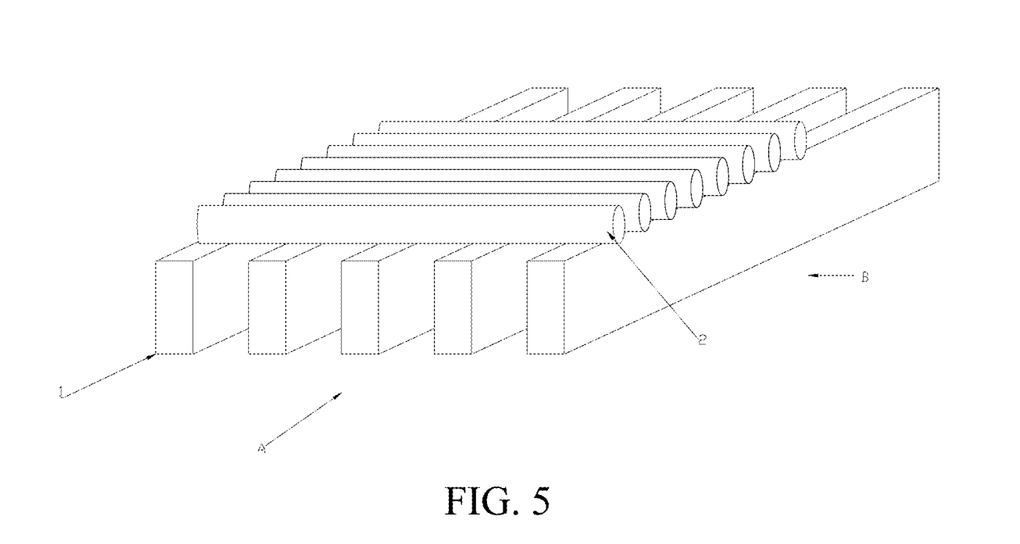
FIG. 5 is a simple three-dimensional schematic diagram of assembling of the main air supply pipeline and the flexible air grid unit.

When tempered glass is processed, main air supply pipelines 1 and flexible air grid units 2 are arranged as in FIG. 5. Arc-changing mechanisms (for the arc-changing mechanism, herein, please refer to a glass bending and forming mechanism in CN201220306623.8) are arranged at two ends of the main air supply pipeline. The flexible air grid unit 2 changed the radian accordingly when the arc-changing mechanism is bent.

Figure 3:
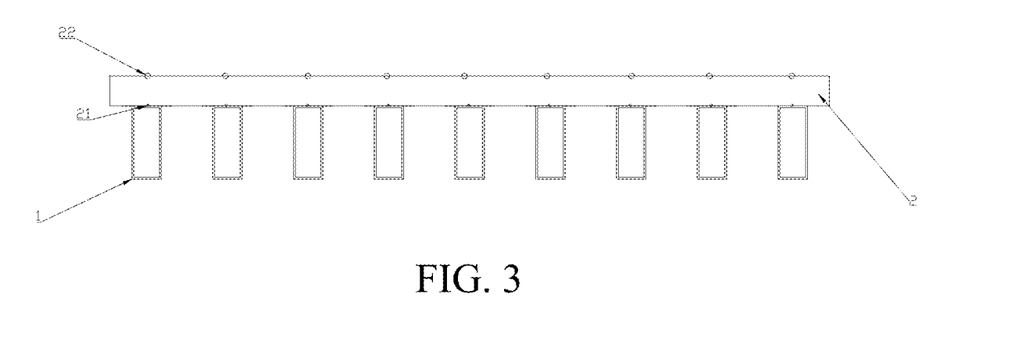
FIG. 3 is a schematic diagram of an assembling plane of a flexible air grid unit and a main air supply pipeline.

The present embodiment provided curved glass tempering apparatus with an effect of weakening stress patterns, referring to FIG. 3, for flexible shaft bent glass tempering. The apparatus comprises a flexible air grid, the flexible air grid comprising one or more flexible air grid units 2. Each one of the one or more flexible air grid unit 2 is a bendable flexible tubular structure with internal passage. The flexible air grid unit 2 is provided with a plurality of air outflow holes 22 and a plurality of air inflow ports 21. The plurality of air outflow holes 22 and the plurality of air inflow ports 21 are communicated with an interior space of the flexible air grid unit 2. The air outflow hole 22 faces toward the glass to be processed; and the air inflow ports 21 are respectively communicated with air outflow ends of the main air supply pipelines 1.

Figure 4:
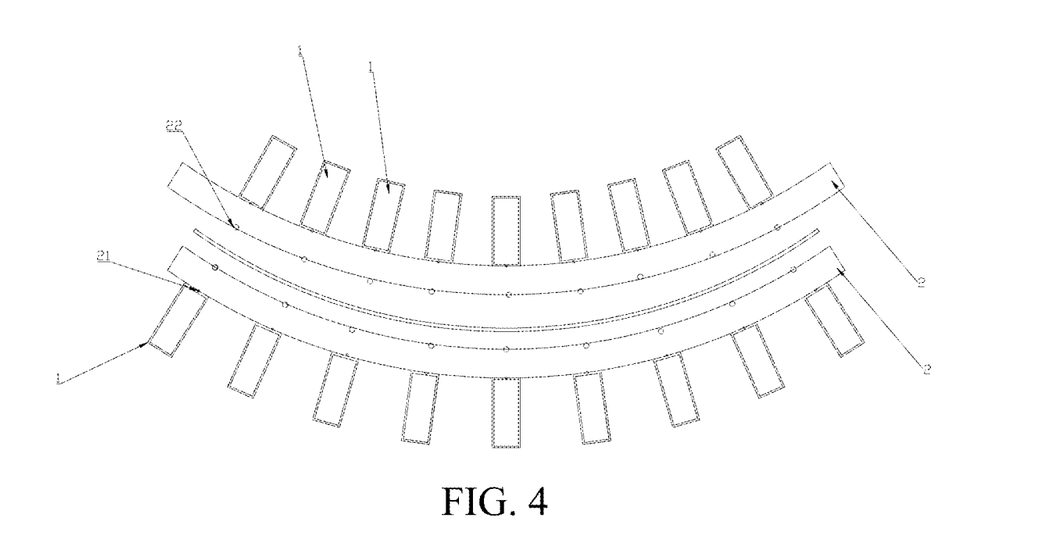
FIG. 4 is a schematic diagram of a bent state for adopting a structure in FIG. 3 when glass is processed.

In use, upper and lower surfaces of the curved glass to be processed are each provided with a structure of the above-mentioned flexible air grid unit 2, through which air is blew to the glass to be processed, referring to FIG. 4; and then the upper and lower surfaces of the glass could be tempered.

The present embodiment showed a flexible air grid mechanism applied to curved glass tempering. Because the whole flexible air grid mechanism is a bendable flexible tubular structure with an internal passage that could uniformly deform with the arc-changing mechanism, the technical solution of the flexible air grid mechanism could avoid a phenomenon that air patterns existed at positions of air box gaps shown by air boxes or air box equivalent substitutions in the prior art and had a remarkable stress pattern weakening effect for curved glass tempering process.

It should be noted that the flexible air grid unit 2 is tubular. The two ends of the flexible air grid unit 2 might not be closed. and are configured as the air inflow ports 21 to blow air from the two ends to an interior space of the flexible air grid unit 2. Airflow is blown out from the air outflow hole 22 and blown to the glass to be processed.

It should also be noted that two axial ends of the flexible air grid unit 2 could be closed structures, so as to ensure that the airflow could only be blown out through the air outflow holes in the flexible air grid unit 2. The flexible air grid unit 2 with an interior passage and end portions closed could be directly and integrally made in production. It is also possible to assemble a main body structure of the flexible air grid unit 2 with the end portions. The main body structure of the flexible air grid unit 2 with the end portions not closed is made first; and then the end portions are sealed at the two axial ends by ways of plugs, bolts, cover plates, etc.

It should be noted that in the prior art, a main air supply pipeline and profile for supporting the flexible air grid used a combined structure. Two components of the combined structure could also be functionally separated, namely, a support satisfying requirements of the arc-changing mechanism was independently provided for the flexible air grid while ventilating at the two end portions of the flexible air grid.

Each tubular flexible air grid and the arc-changing mechanism are bound synchronously. The bending curve is adjusted for each flexible air grid to meet different product requirements.

Embodiment 2

The present embodiment is further limited on the basis of Embodiment 1. A plurality of flexible air grid units 2 are arranged in parallel in the gaps between flexible shaft rollers. A main air supply pipeline 1 is located on one side of the flexible air grid unit 2 opposite to the glass to be processed. The main air supply pipelines 1 arranged in parallel and the plurality of flexible air grid units 2 arranged in parallel are projected vertically into an interlocking mesh shape. The main air supply pipeline 1 is communicated with the flexible air grid unit 2 via an air inflow port 21 at a projection intersection point position, referring to FIG. 5. Arc-changing mechanisms arranged at two ends of the main air supply pipelines 1 arranged in parallel drive the flexible air grid unit 2 to be bent with the arc-changing mechanisms when the glass to be processed is bent and formed. Two axial ends of the flexible air grid unit 2 are closed structures, so as to ensure that the airflow could only be blown out through the air outflow holes in the flexible air grid unit 2. The flexible air grid unit 2 with an interior passage and end portions closed could be directly and integrally made in production. It is also possible to assemble a main body structure of the flexible air grid unit 2 with the end portions. The main body structure of the flexible air grid unit 2 with the end portions not closed is made first; and then the end portions are sealed at the two axial ends by ways of plugs, bolts, cover plates, etc.

The flexible air grid unit 2 is a metal corrugated pipe. The main air supply pipelines 1 arranged in parallel and the plurality of flexible air grid units 2 arranged in parallel have an angle of 90° on a vertical projection plane.

It should be noted that since the arc-changing mechanisms will link the main air supply pipelines when the arc-changing mechanisms are in an operating state, the main air supply pipelines in their operating state would not be completely in an absolutely parallel state with each other.

Embodiment 3

The present embodiment provided curved glass tempering apparatus with air outflow mechanisms on the basis of Embodiment 1. The apparatus further comprises the air outflow mechanisms. The air outflow mechanism is arranged on a flexible air grid unit 2, and comprises a fluid smoothing structure arranged on an inner wall of the flexible air grid unit 2 and/or an outlet airflow orienting and stabilizing structure arranged on an outer wall of the flexible air grid unit 2. The fluid smoothing structure is configured to reduce resistance when airflow circulates in the flexible air grid. The outlet airflow orienting and stabilizing structure is configured to constrain the direction of the jetted airflow and make the flow velocity and flow quantity of the airflows more uniform at the same time.

The fluid smoothing structure and the outlet airflow orienting and stabilizing structure might be arranged alternatively or in cooperation.

Embodiment 4

Figure 6:
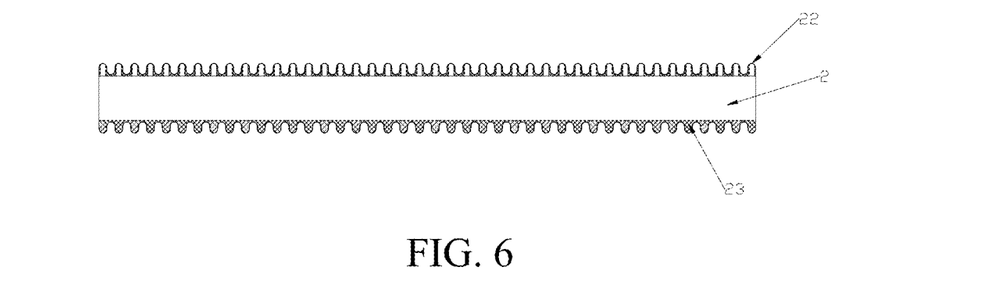
FIG. 6 is a longitudinal sectional diagram of an axis of a flexible air grid unit with a fluid smoothing structure.

The present embodiment is further limited on the basis of Embodiment 3. Flexible air grid unit 2 is a corrugated pipe. The corrugated pipe is provided with an air outflow hole 22 in a direction facing toward the glass to be processed. The corrugated pipe is further provided with an air supply port communicated with main air supply pipeline 1. Referring to FIG. 6, the fluid smoothing structure is a composite rubber layer 23 arranged on the inner wall for filling a corrugated inner wall of the corrugated pipe into a smooth inner wall.

When the inner wall of the corrugated pipe full of corrugations is changed to the smooth inner wall, the internal fluid resistance of the corrugated pipe becomes smaller. In addition, the wall thickness at the air outflow hole 22 is increased, and the swinging of the spraying direction of the airflow becomes smaller.

Embodiment 5

Figure 7:
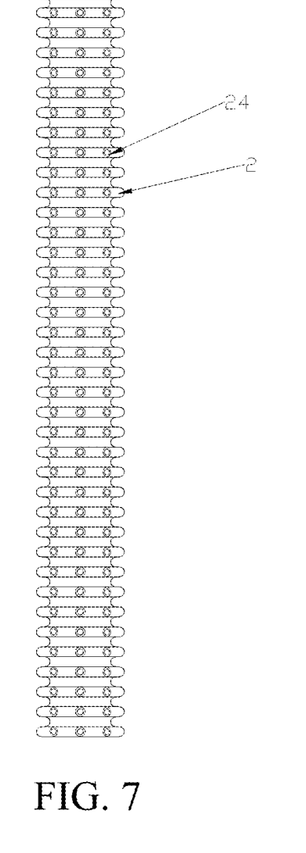
FIG. 7 is a top view of a flexible air grid unit with independent air nozzles.

The present embodiment is further limited on the basis of Embodiment 3. Flexible air grid unit 2 is a corrugated pipe. The corrugated pipe is provided with an air outflow hole 22 in the direction facing toward the glass to be processed. The corrugated pipe is further provided with an air supply port communicated with main air supply pipeline 1. Referring to FIG. 7, the air outflow hole 22 is located at a position of the corrugated pipe with the maximum corrugation outer diameter. An outlet airflow orienting and stabilizing structure is independent air nozzle 24 communicated with respective one of the air outflow holes 22. The independent air nozzle 24 is of a tubular structure. One end of the independent air nozzle is in butt joint with the air outflow hole 22 and the other end of the independent air nozzle faces toward the glass to be processed. Referring to FIG. 8, 2-4 air outflow holes 22 are formed in each corrugation in the direction facing toward the glass to be processed.

Figure 8:
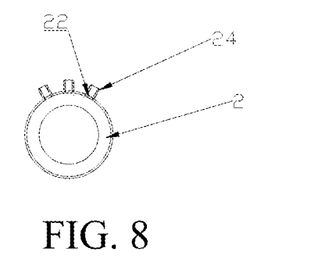
FIG. 8 is a schematic diagram of a radial cross section of FIG. 7.

The independent air nozzle 24 is made of a material not prone to deformation. The inner diameter of the independent air nozzle 24 does not deform when the flexible air grid unit 2 deformed due to the arc-changing mechanism, so that the air direction is determined while air is jetted more stably.

Embodiment 6

Figure 9:
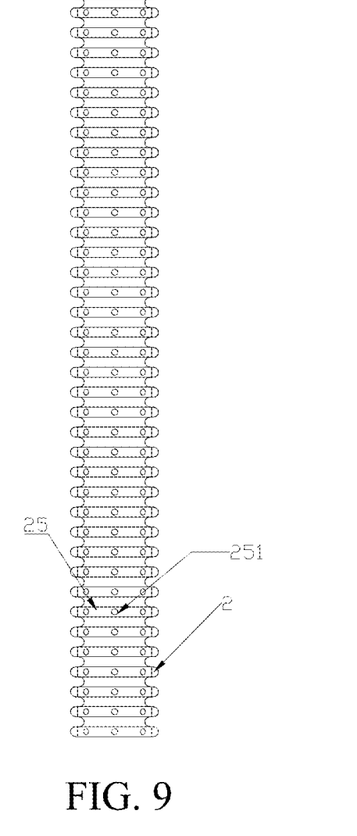
FIG. 9 is a top view of a flexible air grid unit with a fixing piece.
Figure 10:
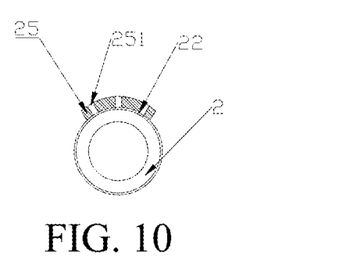
FIG. 10 is a schematic diagram of a radial cross section of FIG. 9.

The present embodiment is further limited on the basis of Embodiment 3 and is a parallel embodiment of Embodiment 5. Flexible air grid unit 2 is a corrugated pipe. The corrugated pipe is provided with an air outflow hole 22 in the direction facing toward the glass to be processed. The corrugated pipe is further provided with an air supply port communicated with main air supply pipeline 1. The air outflow hole 22 is located at a position of the corrugated pipe with the maximum corrugation outer diameter. Referring to FIG. 10, the quantity of the air outflow holes 22 is two or more. The outlet airflow orienting and stabilizing structure is a fixing piece 25 located on a corrugated outer wall of the corrugated pipe and covering the air outflow holes. Referring to FIG. 9, the fixing piece 25 is provided with air spraying holes 251 corresponding to positions of the air outflow holes 22. Each air spraying hole 251 is communicated with the respective air outflow hole 22.

The fixing piece 25 is made of a material not prone to deformation. When the flexible air grid unit 2 deformed due to the arc-changing mechanisms, the hole diameter of the air spraying hole 251 in the fixing piece 25 does not change. Multiple air spraying holes 251 are formed in the fixing piece 25, so that all the air spraying holes 251 in one fixing piece 25 are relatively fixed when air is jetted, the air direction is determined while airflow is more stable.

The air outflow hole is formed in a riveting mode of a rivet. The hole diameter of the air outflow hole is 2-10 mm.

Embodiment 7

The present embodiment provided curved glass tempering apparatus with butt-joint devices. The apparatus further comprises air inflow butt-joint auxiliary devices. The butt-joint auxiliary device 3 is configured for butting main air supply pipeline 1 with flexible air grid unit 2. The butt-joint auxiliary device 3 comprises an air inlet 4, an air outlet 5 and a channel communicating the air inlet with the air outlet. A fixed extension in butt joint with an air supply port 11 of the main air supply pipeline 1 is arranged at the air inlet 4. A butt-joint end 51 in butt joint with an air inflow port 21 of the flexible air grid unit 2 is arranged at the air outlet 5. The butt-joint auxiliary device 3 is a flexible butt-joint auxiliary device. The main air supply pipeline 1 is arranged perpendicular to the flexible air grid unit 2, referring to FIG. 1. The butt-joint auxiliary device 3 is a connection part between the main air supply pipeline and flexible air grid unit, referring to FIG. 11 and FIG. 12.

For the flexible air grid unit 2 with an outer surface being an irregular curved surface, a butt-joint position could be completely matched with an outer contour of the flexible air grid unit 2. When the flexible air grid unit 2 is bent with the arc-changing mechanisms, the outer surface curvature of the flexible air grid unit might change. The butt-joint portion could change into an irregular curved surface accordingly; and an airflow leaking state could not occur. Arc-changing mechanism—(for the arc-changing mechanism, herein, please refer to a glass bending and forming mechanism in CN201220306623.8).

Figure 11:
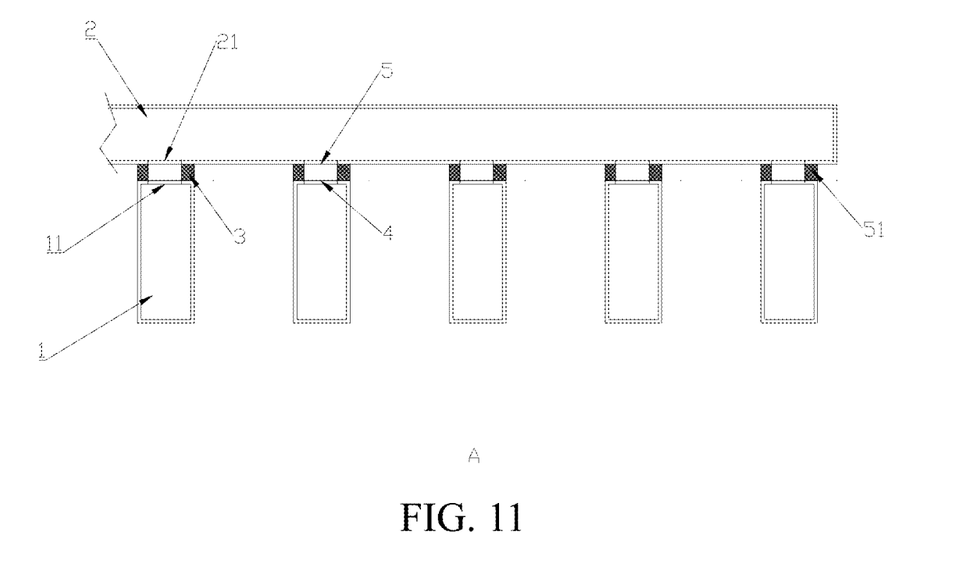
FIG. 11 is a view of FIG. 5 at a visual angle A.

Referring to FIG. 11, when processing curved glass, the airflow starts from the main air supply pipeline 1 via the air supply port 11, and the airflow is sent from the air inflow port 21 to the flexible air grid unit 2 via the butt-joint auxiliary device 3, and jets, via the flexible air grid unit 2, on the curved glass to be processed and tempered.

Embodiment 8

The present embodiment is further limited on the basis of Embodiment 7. The material for a butt-joint auxiliary device 3 is preferentially high-temperature-resistant rubber. With the high-temperature-resistant rubber being a high-elasticity polymer material, the shape of flexible air grid unit 2 could be well fitted when the shape of the outer wall thereof is changed.

Figure 12:
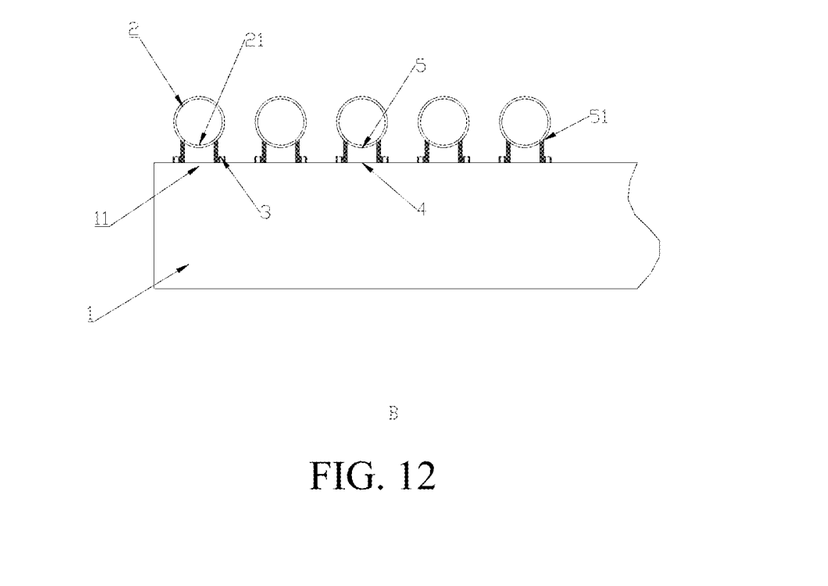
FIG. 12 is a view of FIG. 5 at a visual angle B.

Referring to FIG. 12, a butt joint end 51 is provided with a sealed outer edge matched with an outer wall contour of the flexible air grid unit 2. Better sealed connection with the flexible air grid unit 2 could be realized. The flexible air grid unit 2 is a metal corrugated pipe. The butt joint end 51 is connected with the flexible air grid unit 2 in a bonding mode. The butt joint end 51 is provided with an annular clamping hoop for locking the metal corrugated pipe. The above-mentioned bonding mode being a fixing mode is merely an example. Any connection mode conceivable by a person of ordinary skill in the art could be used to form an alternative solution.

A main air supply pipeline 1 and the butt-joint auxiliary device 3 might be fixedly connected in modes of riveting, gluing, threaded connection, etc., which would not be further stated herein.

The flexible air grid unit 2 is a metal corrugated pipe. The outer surface of a flexible air grid could withstand a high temperature of at least 150° C.

Embodiment 9

Figure 13:
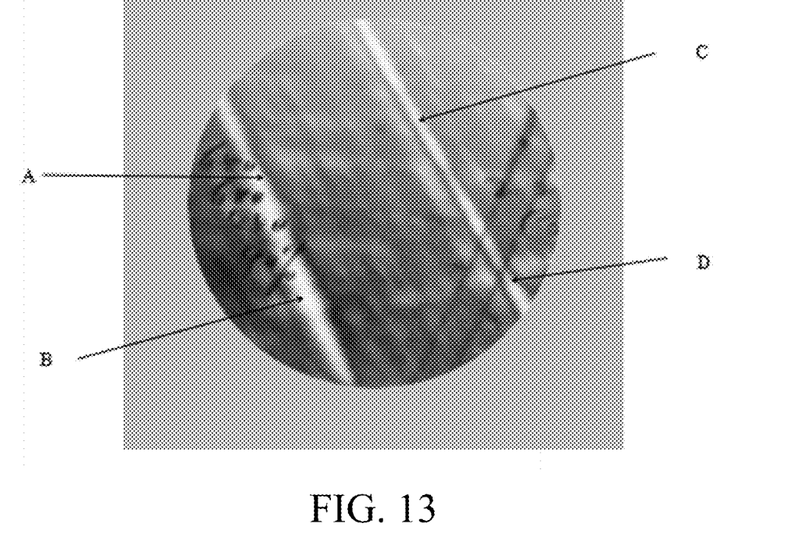
FIG. 13 is a tempered glass air pattern view under a polarizer in the prior art.
Figure 14:
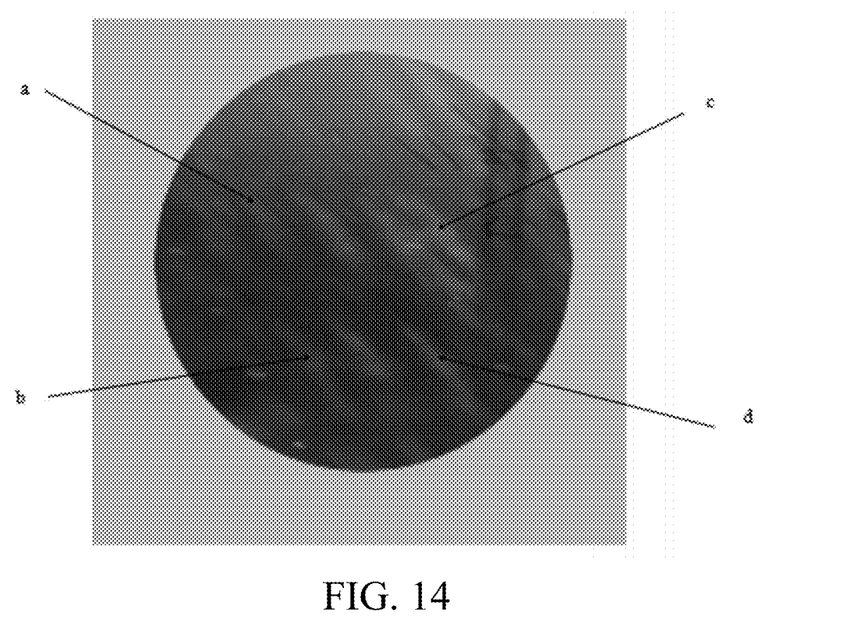
FIG. 14 is a tempered glass air pattern view under a polarizer when the technology of the present disclosure is applied.

The present embodiment provided a comparative example. In FIG. 13, it is air patterns formed when curved glass is tempered by old split-type air boxes under a polarizer. In FIG. 14, it is air patterns formed when curved glass is tempered using an air grid in the technology of the present disclosure under a polarizer. The air pattern in the prior art clearly shows obvious abnormal positions corresponded to air box gaps.

Figure 15:
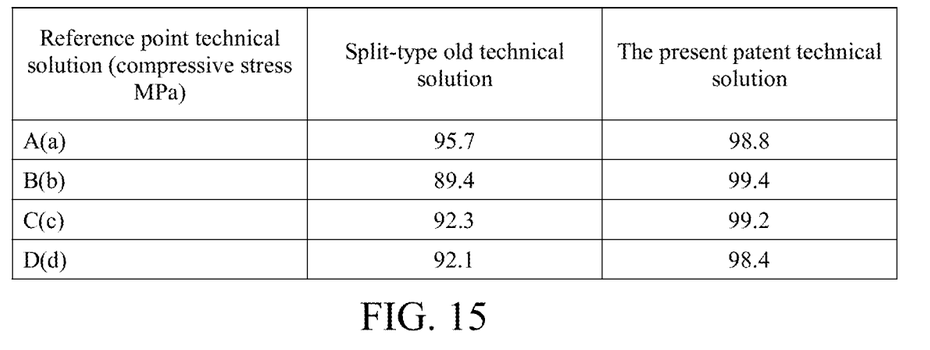
FIG. 15 is an experimental example stress testing table.

FIG. 15 is a table of compressive stress data of four points on each of the air patterns of two curved glass in FIG. 13 and FIG. 14. The surface compressive stress at the air patterns is decreased. The compressive stress of the glass surface is about 98-103 MPa generally during an experiment. But the surface compressive stress at the air patterns is 5-10 MPa lower than that at these general places. Data in this experiment is as follows: the surface compressive stress of other places is 100 MPa; and the lowest surface compressive stress at stripe-shaped air patterns occurred after processing by an old apparatus is 89.4 MPa. However, application of this technology avoids the occurrence of the stripe-shaped air patterns. Only sporadic scattered air patterns appears. The compressive stress reduction at the air patterns is extremely small, and is stabilized in a range of 2 MPa extremely close to 1 MPa, so that the glass tempering strength is greatly improved, with a qualitative leap.

Embodiment 10

A plurality of main air supply pipelines 1 are arranged in parallel at intervals along a direction in a horizontal plane perpendicular to the glass conveying direction. Main air supply pipeline 1 is provided with a plurality of air supply ports 11. An air supply port 11 and an air inflow port 21 are connected via a connecting piece. Two axial end portions of flexible air grid unit 2 are respectively connected to the main air supply pipelines 1 arranged on left and right sides of a tempering section. The left and right herein are based on the movement direction of glass, namely: the movement direction of glass is "front"; the direction opposite to the movement direction of glass is "rear"; the left side of the movement direction of glass is "left"; and the right side of the movement direction of glass is "right". The flexible air grid unit is cylindrical or prismatic.

Finally, it should be noted that the foregoing embodiments are merely used for describing the technical solutions of the present disclosure but are not intended to limit the present disclosure. Although the present disclosure is described in detail with reference to the foregoing embodiments, it should be appreciated by a person having ordinary skill in the art that, modifications may still be made to the technical solutions recorded in the foregoing embodiments, or equivalent replacements may be made to the part of or all of the technical features. These modifications or replacements will not cause the essence of corresponding technical solutions to depart from the scope of the technical solutions in the embodiments of the present disclosure.

What is claimed is:

1. A curved glass tempering apparatus with an effect of weakening stress patterns, configured for glass flexible shaft bending tempering, comprising:
    a flexible air grid,
    wherein:
        the flexible air grid comprises one or more flexible air grid units;
        a particular one of the one or more flexible air grid units is a bendable flexible tubular structure with an internal passage;
        the particular one of the one or more flexible air grid units is provided with a plurality of air outflow holes and a plurality of air inflow ports, the plurality of air outflow holes and the plurality of air inflow ports being communicated with an interior space of the particular one of the one or more flexible air grid units; and
        the plurality of air outflow holes face toward a glass to be processed; and
    a plurality of main air supply pipelines located on a side of the particular one of the one or more flexible air grid units opposite to the glass to be processed,
    wherein:
        a plurality of the one or more flexible air grid units are arranged in parallel in gaps between flexible shaft rollers;
        the plurality of main air supply pipelines arranged in parallel and the plurality of the one or more flexible air grid units arranged in parallel are projected vertically into an interlocking mesh shape;
        one of the plurality of main air supply pipelines is communicated with the particular one of the one or more flexible air grid units via one of the plurality of air inflow ports at a projection intersection point position; and
        arc-changing mechanisms arranged at two ends of the plurality of main air supply pipelines arranged in parallel drive the flexible air grid to be bent with the arc-changing mechanisms when the glass to be processed is bent and formed.

2. The curved glass tempering apparatus with the effect of weakening the stress patterns according to claim 1, wherein the particular one of the one or more flexible air grid units is a corrugated pipe.

3. The curved glass tempering apparatus with the effect of weakening the stress patterns according to claim 1, wherein the plurality of main air supply pipelines arranged in parallel and the plurality of the one or more flexible air grid units arranged in parallel have an angle of 90° on a vertical projection plane.

4. The curved glass tempering apparatus with the effect of weakening the stress patterns according to claim 1,
    wherein:
        the plurality of main air supply pipelines are arranged in parallel at intervals along a direction in a horizontal plane perpendicular to a glass conveying direction;
        the one of the plurality of main air supply pipelines is provided with a plurality of air supply ports;
        the plurality of air supply ports and the plurality of air inflow ports are connected via connecting pieces; and
        two axial end portions of the particular one of the one or more flexible air grid units are respectively connected to main air supply pipelines that are arranged on left and right sides of a tempering section.

5. The curved glass tempering apparatus with the effect of weakening the stress patterns according to claim 1, wherein two axial ends of the particular one of the one or more flexible air grid units are closed structures.

6. The curved glass tempering apparatus with the effect of weakening the stress patterns according to claim 1, wherein the particular one of the one or more flexible air grid units is cylindrical or prismatic.

7. The curved glass tempering apparatus with the effect of weakening the stress patterns according to claim 1, wherein the plurality of air inflow ports are respectively communicated with air outflow ends of the plurality of main air supply pipelines.

8. A curved glass tempering apparatus with an effect of weakening the stress patterns comprising:
    a flexible air grid,
    wherein:
        the flexible air grid comprises one or more flexible air grid units;
        a particular one of the one or more flexible air grid units is a bendable flexible tubular structure with an internal passage;
        the particular one of the one or more flexible air grid units is provided with a plurality of air outflow holes and a plurality of air inflow ports, the plurality of air outflow holes and the plurality of air inflow ports being communicated with an interior space of the particular one of the one or more flexible air grid units; and
    the plurality of air outflow holes face toward a glass to be processed; and
    an air outflow mechanism, wherein the air outflow mechanism comprises:
        a fluid smoothing structure arranged on an inner wall of the particular one of the one or more flexible air grid units; and/or
        an outlet airflow orienting and stabilizing structure arranged on an outer wall of the particular one of the one or more flexible air grid units,
        wherein the fluid smoothing structure is configured to reduce resistance when an airflow circulates in the particular one of the one or more flexible air grid units, and the outlet airflow orienting and stabilizing structure is configured to constrain a direction of a jetted airflow and to make flow velocity and flow quantity of the jetted airflow more uniform.

9. The curved glass tempering apparatus with the effect of weakening the stress patterns according to claim 8, wherein the fluid smoothing structure is a composite rubber layer for filling a corrugated inner wall of a corrugated pipe into a smooth inner wall.

10. The curved glass tempering apparatus with the effect of weakening the stress patterns according to claim 9, wherein one of the plurality of air outflow holes is located at a position of the corrugated pipe with a maximum corrugation outer diameter.

11. The curved glass tempering apparatus with the effect of weakening the stress patterns according to claim 10, wherein:
- the outlet airflow orienting and stabilizing structure is an independent air nozzle communicated with the one of the plurality of air outflow holes;
- the independent air nozzle is of a tubular structure; and
- one end of the independent air nozzle is in a butt joint with the one of the plurality of air outflow holes and another end of the independent air nozzle faces toward the glass to be processed.

12. The curved glass tempering apparatus with the effect of weakening the stress patterns according to claim 10, wherein:
- the outlet airflow orienting and stabilizing structure is a fixing piece arranged on a corrugated outer wall of the corrugated pipe and covering the one of the plurality of air outflow holes;
- the fixing piece comprises an air spraying hole corresponding to a position of the one of the plurality of air outflow holes; and
- the air spraying hole is communicated with the one of the plurality of air outflow holes.

13. The curved glass tempering apparatus with the effect of weakening the stress patterns according to claim 8, further comprising:
an air inflow butt-joint auxiliary device,
wherein:
- the air inflow butt-joint auxiliary device is configured for butting a main air supply pipeline with a flexible air grid unit of the one or more flexible air grid units;
- the air inflow butt-joint auxiliary device comprises an air inlet, an air outlet, and a channel communicating the air inlet with the air outlet;
- a fixed extension in a butt joint with an air supply port of the main air supply pipeline is arranged at a position of the air inlet; and
- a butt-joint end in butt joint with an air inflow port of the flexible air grid unit is arranged at a position of the air outlet.

14. The curved glass tempering apparatus with the effect of weakening the stress patterns according to claim 13, wherein the butt-joint end is provided with a sealed outer edge matched with an outer wall contour of the flexible air grid unit.

15. The curved glass tempering apparatus with the effect of weakening the stress patterns according to claim 14, wherein the butt-joint end is provided with an annular clamping hoop for locking a corrugated pipe.

16. The curved glass tempering apparatus with the effect of weakening the stress patterns according to claim 13, wherein the flexible air grid unit is a corrugated pipe.

17. The curved glass tempering apparatus with the effect of weakening the stress patterns according to claim 16, wherein the butt-joint end is connected with the flexible air grid unit in a bonding mode or a riveting mode.

18. The curved glass tempering apparatus with the effect of weakening the stress patterns according to claim 13, wherein the butt-joint auxiliary device is a flexible butt-joint auxiliary device.

19. The curved glass tempering apparatus with the effect of weakening the stress patterns according to claim 18, wherein the flexible butt-joint auxiliary device is made from a high-temperature-resistant rubber.

\* \* \* \* \*